US008396009B2

(12) United States Patent
Brown et al.

(10) Patent No.: US 8,396,009 B2
(45) Date of Patent: Mar. 12, 2013

(54) METHOD AND APPARATUS FOR AN ADAPTER IN A NETWORK DEVICE TO DISCOVER ITS ADAPTER NAME IN A NETWORK SYSTEM

(75) Inventors: Aaron C. Brown, Austin, TX (US); Scott M. Carlson, Tucson, AZ (US); Kevin J. Gildea, Bloomington, NY (US); Roger G. Hathorn, Tucson, AZ (US); Jeffrey W. Palm, Rochester, MN (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1007 days.

(21) Appl. No.: 11/842,447

(22) Filed: Aug. 21, 2007

(65) Prior Publication Data

US 2009/0052345 A1 Feb. 26, 2009

(51) Int. Cl.
*H04L 12/28* (2006.01)
*H04L 12/56* (2006.01)
*G06F 15/177* (2006.01)
*G06F 15/16* (2006.01)

(52) U.S. Cl. ............ 370/254; 370/389; 370/395.3; 370/400; 709/220; 709/245

(58) Field of Classification Search .......... 370/254–255, 370/389–394, 395.3, 400–401; 709/217–220, 709/245, 249–251
See application file for complete search history.

(56) References Cited

U.S. PATENT DOCUMENTS

| 5,491,817 | A | 2/1996 | Gopal | |
|---|---|---|---|---|
| 6,292,838 | B1 | 9/2001 | Nelson | |
| 6,424,654 | B1* | 7/2002 | Daizo | 370/401 |
| 6,704,768 | B1* | 3/2004 | Zombek et al. | 709/201 |
| 7,043,578 | B2 | 5/2006 | Hufferd | |
| 2002/0032797 | A1* | 3/2002 | Xu | 709/238 |
| 2002/0034180 | A1* | 3/2002 | Kroeger et al. | 370/392 |
| 2002/0114328 | A1 | 8/2002 | Miyamoto | |
| 2004/0003292 | A1 | 1/2004 | Kato | |
| 2004/0030806 | A1 | 2/2004 | Pandya | |
| 2004/0103275 | A1* | 5/2004 | Ji et al. | 713/150 |
| 2004/0267692 | A1 | 12/2004 | Jones | |
| 2005/0025075 | A1 | 2/2005 | Dutt | |
| 2005/0141419 | A1 | 6/2005 | Bergamasco | |
| 2005/0154794 | A1* | 7/2005 | Deshpande | 709/227 |

(Continued)

FOREIGN PATENT DOCUMENTS

| JP | 2005064901 A | 3/2005 |
|---|---|---|
| WO | 2009085536 A2 | 7/2009 |

OTHER PUBLICATIONS

Cheriton—"Decentralizing a Global Naming Service for Improved Performance and Fau't Tolerance", Proc. IEEE ASICON05 (2005).

(Continued)

*Primary Examiner* — Tri H Phan
(74) *Attorney, Agent, or Firm* — Matt Talpis; Mark P Kahler

(57) ABSTRACT

A network system supports multiple network communication protocols. In one embodiment, network device driver software provides a "Fibre Channel over Ethernet" communication capability and methodology. Device driver software manages a Fibre Channel to Ethernet and Ethernet to Fibre Channel address translation in real time for data packet communications in the network system. Different embodiments of the disclosed network system include multiple name servers and network device driver software that together provide multiple adapter name discovery methodologies. In one embodiment, the adapter name discovery methodologies include port name discovery and adapter attributes discovery.

8 Claims, 13 Drawing Sheets

U.S. PATENT DOCUMENTS

| | | |
|---|---|---|
| 2005/0192967 A1 | 9/2005 | Basavaiah |
| 2005/0210150 A1* | 9/2005 | Bahl .......................... 709/245 |
| 2005/0249247 A1 | 11/2005 | Shanley |
| 2006/0087989 A1 | 4/2006 | Gai |
| 2006/0098589 A1 | 5/2006 | Kreeger |
| 2006/0098681 A1 | 5/2006 | Cafiero |
| 2006/0101140 A1 | 5/2006 | Gai |
| 2006/0159032 A1 | 7/2006 | Ukrainetz |
| 2006/0251067 A1 | 11/2006 | DeSanti |
| 2007/0002883 A1 | 1/2007 | Edsall |
| 2007/0112931 A1 | 5/2007 | Kuik |
| 2008/0028096 A1 | 1/2008 | Henderson et al. |
| 2008/0159260 A1 | 7/2008 | Vobbilisetty |
| 2009/0041046 A1* | 2/2009 | Hirata .......................... 370/402 |
| 2009/0052346 A1* | 2/2009 | Brown et al. .................. 370/254 |
| 2009/0052461 A1* | 2/2009 | Brown et al. .................. 370/401 |
| 2009/0161692 A1* | 6/2009 | Hirata et al. .................. 370/466 |

OTHER PUBLICATIONS

Fibrechannel—"Overview of the Technology"—(dnld. From www.fibrechannel.org on Apr. 10, 2007).

Fibrechannel1—"Fibre Channel—Link Services, Rev. 1.62"—Global Engineering (Dec. 4, 2006).

Fibrechannel2—"Fibre Channel—Generic Services, Rev 9.00"—Global Engineering (Jan. 8, 2007).

Gillies—"The Clearinghouse: Anti Entropy . . . "—University of British Columbia (Apr. 18, 2003).

IBM—Scheme for Eliminating Ambiguities in Fibre Channel Port Names, IP.com (Apr. 18, 2007).

Maxcer—"New Network Standard Could Converge Fiber, Ethernet", Tech News (Apr. 6, 2007).

Muse—"Vendors Propose Fibre Channel Over Ethernet Standard", Internet News (Apr. 5, 2007).

Oppen—"A Decentralized Agent for Locating Named Objects in a Distributed Environment", ACM (1983).

Peterson—"Info Tech—Fibre Channel Protocol for SCSI" (Oct. 30, 2006).

Seeber—"Storage Area Networking"—Resolution (Sep. 2006).

\* cited by examiner

ENHANCED ETHERNET TO FIBRE CHANNEL TRANSLATION

800
NETWORK SYSTEM
WITH ADAPTERS, SWITCHES AND NAME SERVERS

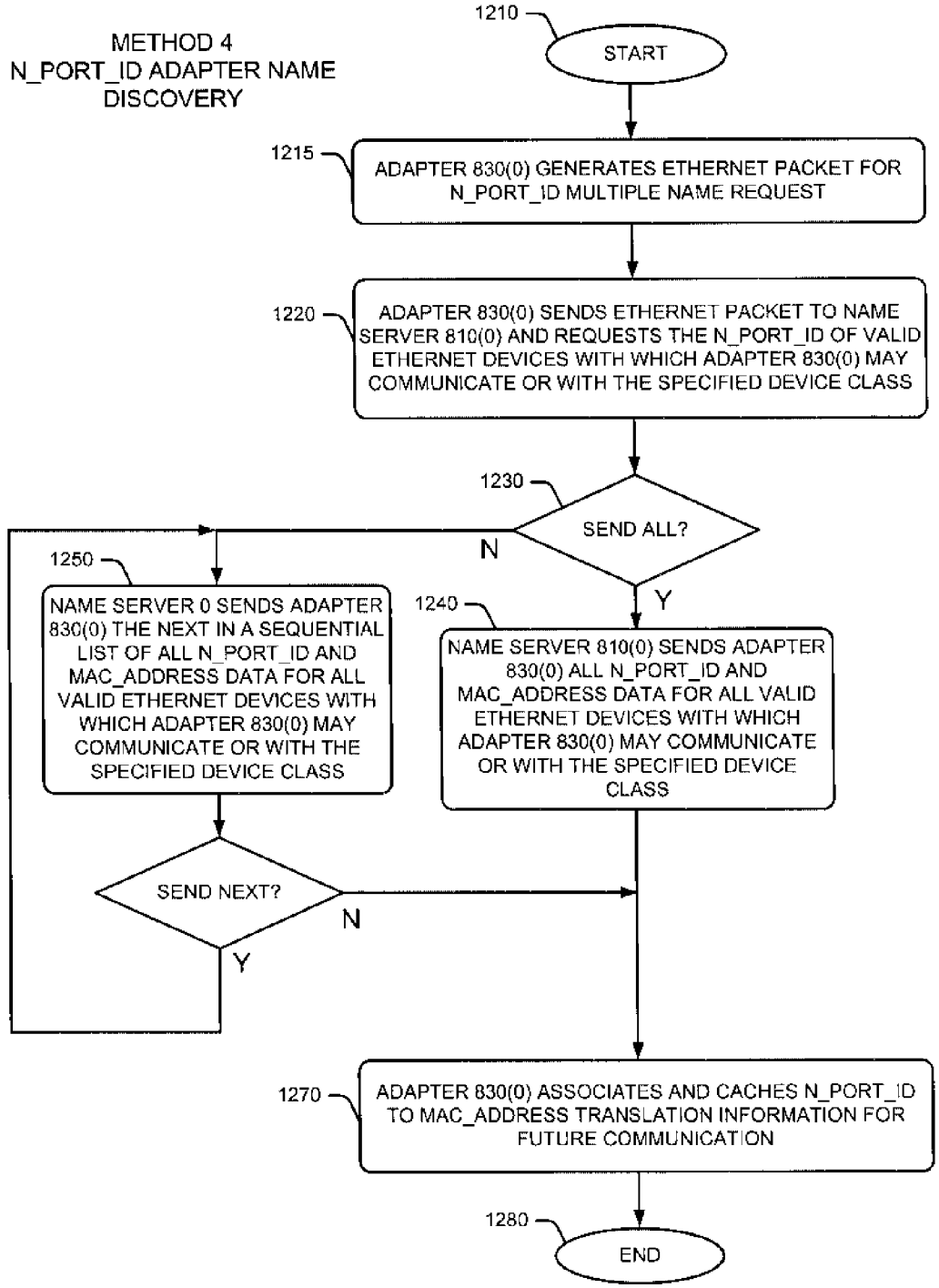

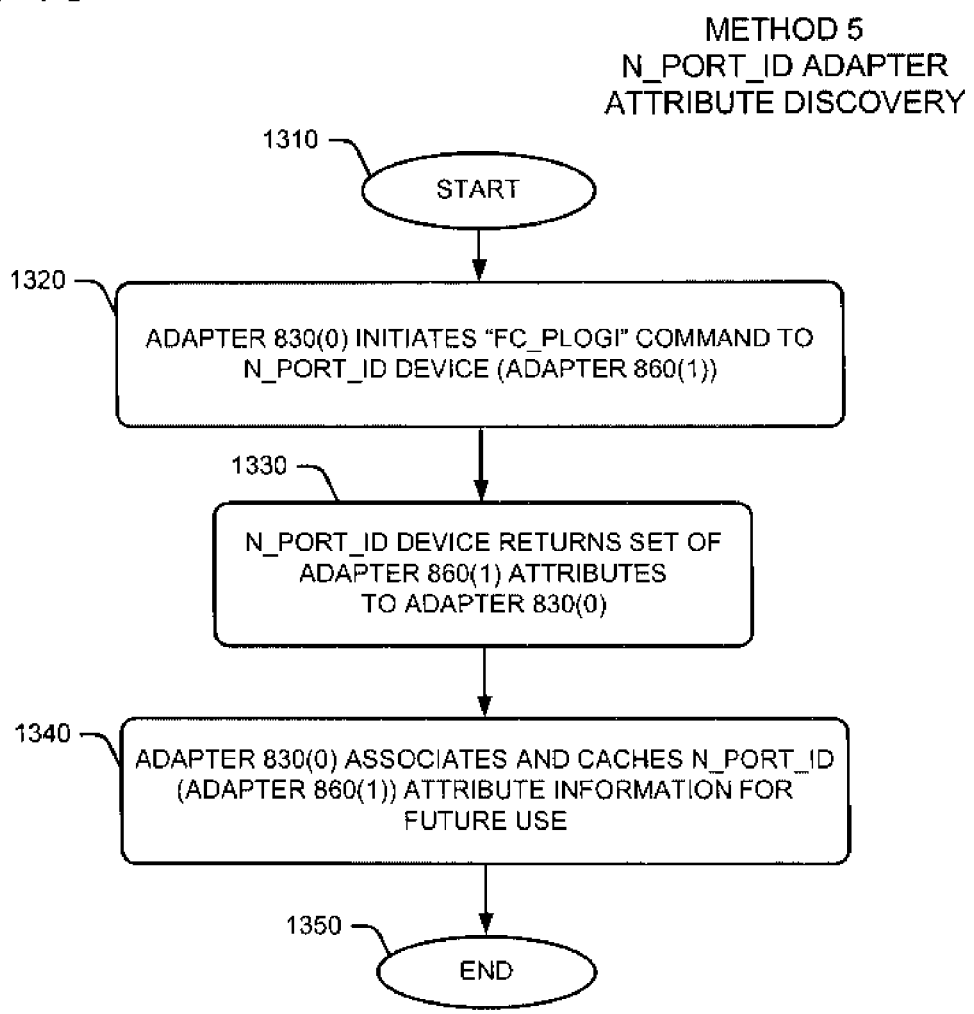

METHOD AND APPARATUS FOR AN ADAPTER IN A NETWORK DEVICE TO DISCOVER ITS ADAPTER NAME IN A NETWORK SYSTEM

CROSS REFERENCE TO RELATED PATENT APPLICATIONS

This patent application also relates to the U.S. Patent Application entitled "METHOD AND APPARATUS FOR FIBRE CHANNEL OVER ETHERNET DATA PACKET TRANSLATION VIA LOOK UP TABLE CONVERSION BRIDGE IN A NETWORK SYSTEM, inventors Brown, et al., application Ser. No. 11/842,388, filed concurrently herewith on Aug. 21, 2007 and assigned to the same assignee, the disclosure of which is incorporated herein by reference in its entirety.

This patent application relates to the U.S. Patent Application entitled "METHOD AND APPARATUS FOR ENABLING AN ADAPTER IN A NETWORK DEVICE TO DISCOVER THE NAME OF ANOTHER ADAPTER OF ANOTHER NETWORK DEVICE IN A NETWORK SYSTEM", inventors Brown, et al., application Ser. No. 11/842,473, filed concurrently herewith on Aug. 21, 2007 and assigned to the same assignee), the disclosure of which is incorporated herein by reference in its entirety.

TECHNICAL FIELD OF THE INVENTION

The disclosures herein relate generally to network systems, and more particularly, to Fibre Channel over Ethernet (FCoE) data communication in network systems.

BACKGROUND

A network system may include multiple server information handling systems (IHSs), client IHSs, or other network devices for processing, handling, communicating or otherwise manipulating network information. For example, multiple client IHSs may connect to a server IHS over a network that provides communications and other data management in a small business environment. Server IHSs deliver information and software to other client IHSs that link through a network system. Server IHSs handle requests for data, email, file transfer, and other network services from client IHSs. A server IHS may be a file server IHS that stores files for use by other network devices, or a print server IHS that manages one or more printers for other network devices, or other special purpose server IHS types as well. When employing a multi-tasking operating system, a single server IHS may manage multiple programs and thus handle multiple server functions such as Internet communication, database management, email handling, and other server functions simultaneously. Client IHSs may send data requests in the form of frames or data packets to one or more server IHSs. Ethernet data packets or frames provide a standard data format for data transmissions from network device to network device in a network system.

Although Ethernet protocols are common in network systems, other communication protocols such as Fibre Channel protocols provide another communication approach. Fibre Channel protocols provide a methodology for communicating between server IHSs and client IHSs. Mixing Ethernet and Fibre Channel protocols provides unique opportunities for utilizing the special capabilities of each. For example, Fibre Channel network devices can provide significant improvement in the data storage and data retrieval capabilities of a network system. Fibre Channel data packets are not identical in structure to Ethernet data packets and thus require translation mechanisms to function properly within a partial or predominantly Ethernet protocol network system. One translation methodology is disclosed in the U.S. patent application entitled "Fibre Channel over Ethernet", inventors Cafiero, et al., (Publication Number US2006/0098681 A1), the disclosure of which is incorporated herein by reference in its entirety. The term "Fibre Channel over Ethernet" or "FCoE" as used herein means any protocol or any system that transmits Fibre Channel frames directly over Ethernet.

What is needed is an apparatus and methodology that addresses the problems of transmitting Fibre Channel data packets through an Ethernet fabric in an existing network system.

What is also needed is an apparatus and methodology that facilitates the discovery of names for network adapters in a network system.

SUMMARY

Accordingly, in one embodiment, a method of adapter name discovery in a network system is disclosed. The method includes providing a first plurality of name server network devices that communicates with a second plurality of network devices via a network fabric. The method also includes requesting an adapter name, by a requester adapter in a network device in the second plurality of network devices, the requester adapter transmitting a discover name request to the first plurality of name server network devices. The method further includes transmitting, by each name server network device, a respective adapter name to the requester adapter. The method still further includes selecting, by the requester adapter, one of the adapter names transmitted by the name server network devices as the selected name for the requester adapter, the name server network device that transmitted the selected name being designated the particular name server network device. The method also includes transmitting, by the requester adapter, a request for the selected name that targets the particular name server network device.

In another embodiment, a method of adapter name discovery in a network system is disclosed. The method includes providing a first plurality of name server network devices that communicate with a second plurality of network devices via a network fabric. The method also includes transmitting, by a requester adapter in a network device in the second plurality of network devices, a name server discover request to the plurality of name server network devices to determine which names server network devices couple to the fabric. The method further includes transmitting, by the name server network devices, respective responses that identify the name server network devices that couple to the network fabric. The method still further includes transmitting, by one of the name server network devices a name assignment to the requester adapter.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 12 is a flow chart that depicts an adapter N_Port_ID names discovery method 2 of the network system of FIG. 8.

FIG. 13 is a flow chart that depicts an adapter N_Port_ID attributes discovery method of the network system of FIG. 8.

DETAILED DESCRIPTION

Figure 1:
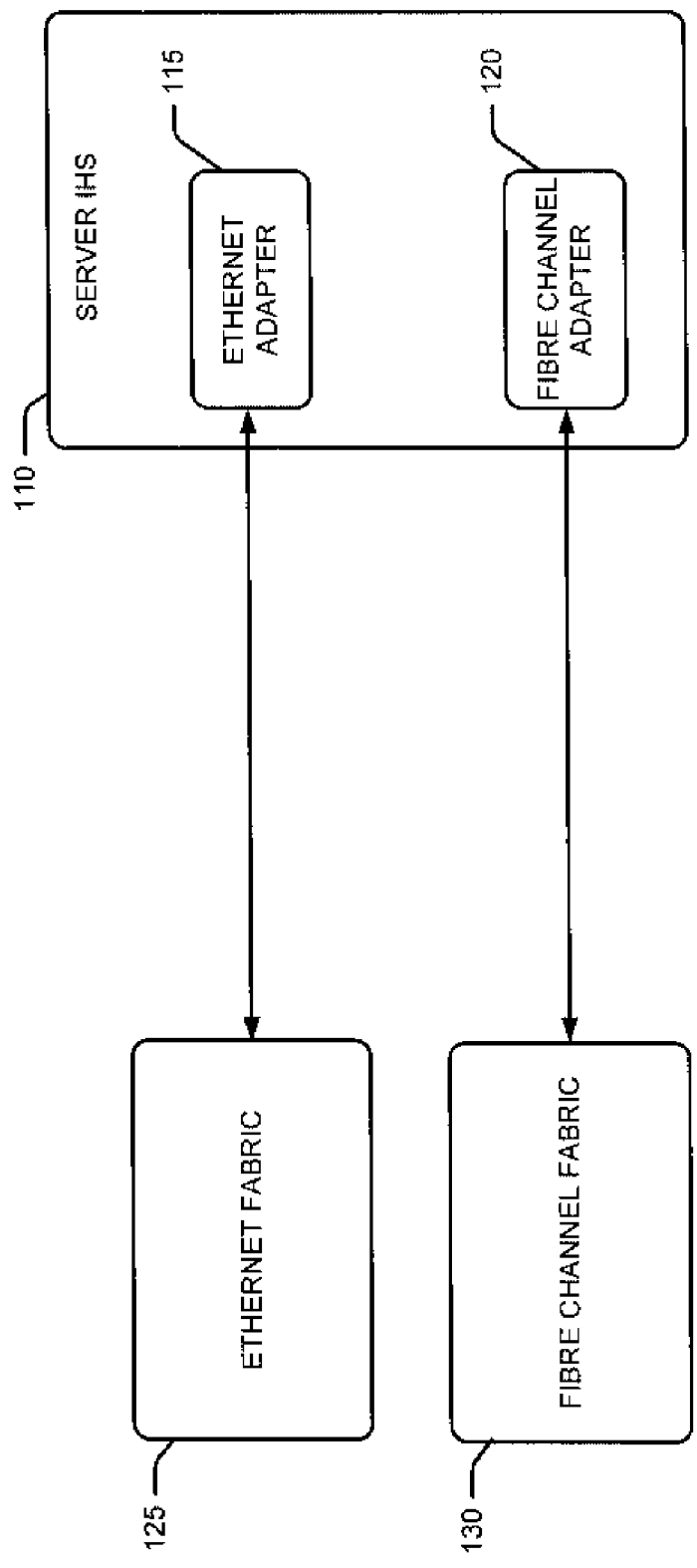
FIG. 1 is a block diagram of a conventional network system with multiple adapters for multiple network protocols.

Ethernet protocol refers to one type of network system protocol that a local area network (LAN) may employ. A conventional specification for a LAN often employs Ethernet protocols. The Ethernet standard provides the hardware and software interfaces for network devices in a network system. Ethernet also provides for connection of a network system to the Internet via a cable modem, a DSL modem, or other communications interface. The IEEE 802.3 standard defines the basic structure and protocol of Ethernet network systems. A network fabric is the physical infrastructure of a network that enables the connection of one network device to another network device. Network fabrics typically include connective cabling such as twisted pair wiring, coaxial cable, fiber optic cable or other connectivity structures. Network fabrics may also include network switches, network routers, network hubs and other connective network devices that share a common bandwidth and network protocol such as Ethernet, Fibre Channel, or other network protocol.

Ethernet network devices transmit data with Ethernet frames that are commonly known as Ethernet data packets. Ethernet data packets are variable length data transmissions that typically exhibit lengths from 72 to 1518 bytes. Each Ethernet data packet includes a header with the addresses of the source and destination network devices, a data area, and a trailer that includes error correction data. Other network protocols such as IP (Internet Protocol) and IPX (Internetwork Packet EXchange) may fragment longer data transmissions through special use of Ethernet frames or data packets. In a similar process, Fibre Channel frames or data packets provide the data transmission mechanism for the Fibre Channel protocol. Fibre Channel is currently a multi-gigabit network technology that network systems employ primarily for use by storage devices. Fibre Channel is a standard in the T11 Technical Committee of the International Committee for Information Technology Standards (INCITS) and the American National Standards Institute (ANSI). Despite the name, Fibre Channel signals may operate over copper wire as well as fiber optic cables. Fibre Channel Protocol (FCP) is the interface protocol of the Small Computer System Interface (SCSI) in a Fibre Channel network system.

One problem that exists when supporting multiple network protocols in a server IHS is a connectivity issue between a server IHS and other network devices such as a client IHS. A server IHS requires multiple adapter types and cabling to handle each network protocol type. This multiple protocol network system requires the use of different fabric managers for each protocol type as well. In other words, if a server IHS in a network system employs both Ethernet and Fibre Channel protocols, the server IHS typically requires both an Ethernet adapter and a Fibre Channel adapter, as well as respective fabric managers for each protocol. Such a server IHS may also require respective cabling for the Ethernet adapter and the Fibre Channel adapter.

FIG. 1 shows a conventional network system 100 that includes a server IHS 110 with a dedicated Ethernet adapter 115 and a dedicated Fibre Channel adapter 120. Network system 100 may be a local area network (LAN) or other network system. Ethernet adapter 115 in server IHS 110 couples to an Ethernet fabric 125, as shown. Ethernet adapter 115 provides a communications interface for any network device of Ethernet fabric 125 that needs connectivity to a network server such as server IHS 110. More specifically, network adapters control the transmission and reception of network data between network devices via data packets therein. An example of an Ethernet adapter may include a network interface card (NIC) common in personal computer (PC) systems. It is common in modern network ready PCs to find network adapters built into or integrated with the motherboard of such systems. Ethernet fabric 125 represents any number of Ethernet devices such as switches, routers, hubs, etc. Ethernet fabric 125 may connect to any number of other multiple Ethernet protocol adapters (not shown) of other network servers or network clients outside of Ethernet fabric 125. In one simplistic example however, Ethernet fabric 125 may contain only cable interconnects and/or wiring with no discrete network devices.

Server IHS 110 includes a Fibre Channel adapter 120 that couples to a Fibre Channel fabric 130. Fibre Channel adapter 120 provides the communications interface for any network device of Fibre Channel fabric 130 that needs connectivity to a network server such as server IHS 110. Fibre Channel fabric 130 represents a grouping of one or more Fibre Channel devices such as switches, routers, hubs, etc. Fibre Channel fabric 130 may connect to any number of other multiple Fibre Channel protocol adapters (not shown) of other server IHSs or client IHSs outside of Fibre Channel fabric 130. In one simplistic example however, Fibre Channel fabric 130 may simplify to only Fibre Channel communication interconnects and/or wiring with no specific discrete network devices.

In the example of FIG. 1, server IHS 110 employs Ethernet adapter 115 and Fibre Channel adapter 120 for dedicated communications with their respective fabrics. More particularly, all Ethernet protocol fabric devices connect to server IHS 110 through Ethernet adapter 115. For this example, any Ethernet device must connect through Ethernet adapter 115 and not through Fibre Channel adapter 130. Conversely, all Fibre Channel protocol fabric devices connect to server IHS 110 through Fibre Channel adapter 130 only. In this way, communication protocols for Ethernet and Fibre Channel do not mix, but rather remain in their respective areas or zones of network system 100.

A network system may provide better performance by allowing Fibre Channel data packets and Ethernet data packets to communicate with a server IHS through the same server IHS adapter. A method for converging network system protocols is disclosed herein for sending Fibre Channel data packets over an Ethernet fabric. A MAC (media access control) Address or MAC_Address is a unique code that operating system (OS) software, device driver software, or other software or hardware assigns to each unique network device in a network system. More specifically, OS software or device driver software may permanently assign a unique MAC_Address to each hardware device such as a wireless card, network adapter, or other network device requiring network data communications. In another embodiment, manufacturers may pre-assign a factory unique MAC_Address to a network device such as an Ethernet network card. A MAC_Address typically includes 48 bits or six pairs of numbers or letters, as in A0:92:E3:46:CE:25. The unique MAC_Address identifier of each network device provides server IHSs with an authentication ability to determine which network device can communicate with another network device. In a typical network system such as a LAN, or other network system, the MAC_Address is a unique hardware number that associates with the network device (such as a server IHS).

Networking technologies and protocols use a variety of methods to identify ports. TCP/IP uses port numbers to identify application processes or network services. TCP headers and UDP headers contain such port numbers. In Ethernet methodology, 48 bit MAC addresses uniquely identify ports. Each Ethernet frame contains a source and destination MAC address in a frame header. Fibre Channel methodology identifies ports with respective 24 bit N_Port_IDs. Thus, a variety of methods may uniquely identify entities within networks. A data packet originator uses such port identifiers to address data packets. Network devices such as switches and routers use these identifiers to route data packets to the proper destination. Port identifiers are an important part of network systems but vary according to the technology and protocol that a particular network system employs.

Figure 2:
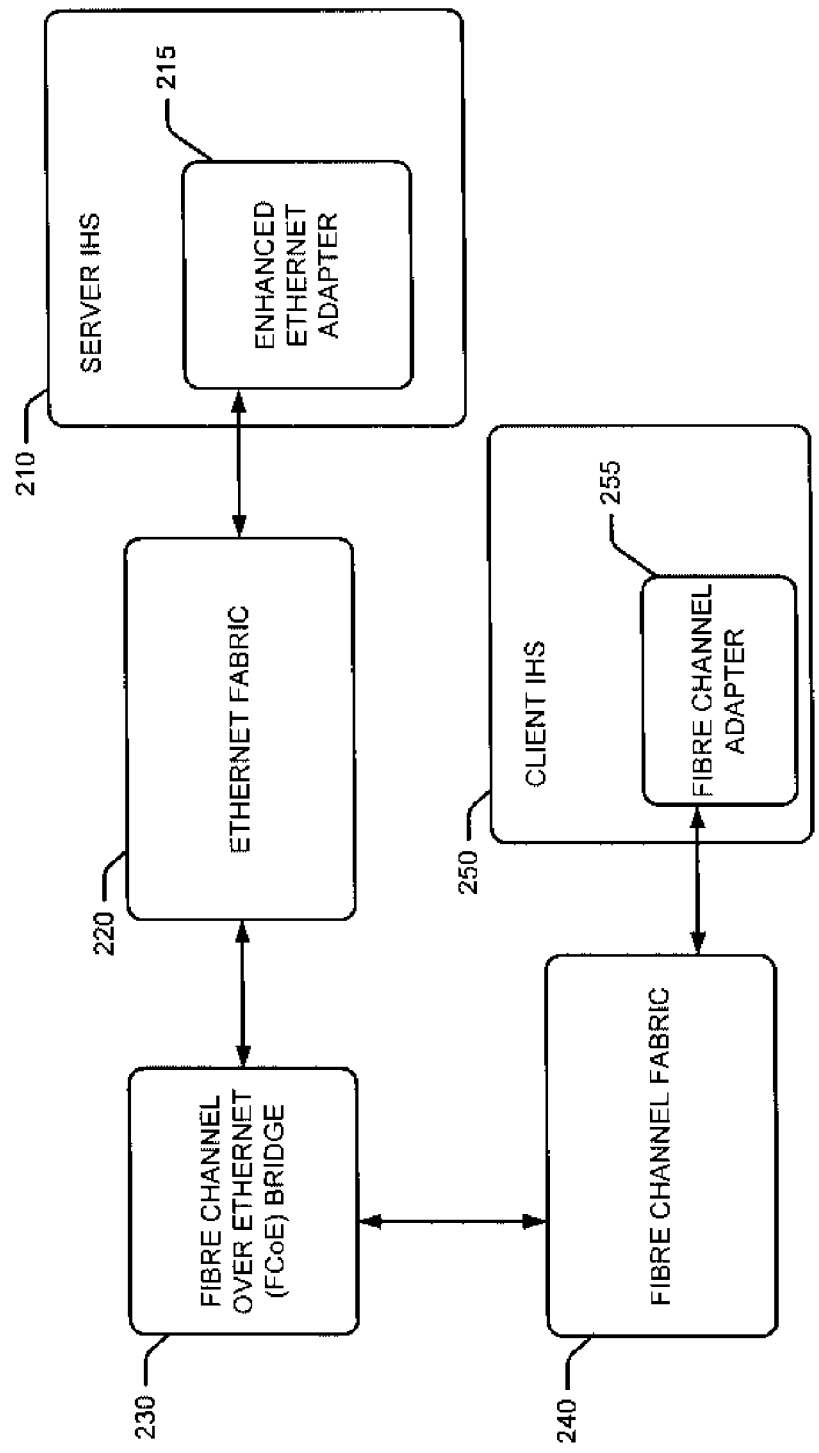
FIG. 2 is a block diagram of a network system employing the disclosed Fibre Channel over Ethernet capability and methodology.

FIG. 2 shows a simplified block diagram of a representative network system 200 with FCoE capability that employs the disclosed "Fibre Channel over Ethernet" (FCoE) methodology and apparatus. In one embodiment, network system 200 includes a server IHS 210. Server IHS 210 includes an enhanced Ethernet adapter 215. Enhanced Ethernet adapter 215 employs an FCoE communications capability. More specifically, enhanced Ethernet adapter 215 has the ability to communicate across conventional Ethernet communication pathways with protocols that include Fibre Channel over Ethernet communications. In one example, enhanced Ethernet adapter 215 reads and interprets conventional Ethernet data packets at the interface into server IHS 210, and cooperatively reads Fibre Channel data packets at the same interface. Enhanced Ethernet adapter 215 couples to an Ethernet fabric 220. Ethernet fabric 220 includes any number of interconnecting Ethernet devices such as Ethernet switches, Ethernet routers, Ethernet hubs, etc. In one example, Ethernet fabric 220 may include only Ethernet wiring or cable interconnects and thus no discrete Ethernet network devices. Ethernet fabric 220 couples to a Fibre Channel over Ethernet (FCoE) conversion or translation bridge 230.

In one embodiment, FCoE conversion bridge 230 provides the methodology and apparatus to convert a Fibre Channel network data packet to an FCoE network data packet. The resultant FCoE network data packet routes through Ethernet fabric 220 to server IHS 210, or more specifically to Enhanced Ethernet adapter 215 within server IHS 210. A Fibre Channel fabric 240 couples to FCoE conversion bridge 230 as shown in FIG. 2. Fibre Channel fabric 240 may contain any number of Fibre Channel network devices such as Fibre Channel routers, hubs, switches, etc. In one example, Fibre Channel fabric 240 may contain only Fibre Channel interconnects for providing communications paths for data between FCoE bridge 230 and other Fibre Channel adapters. FIG. 2 shows one such Fibre Channel adapter 255 in a client IHS 250 that couples to Fibre Channel fabric 240. In one embodiment, client IHS 250 may be a network storage device.

Communication or transfer of network data from Fibre Channel devices such as Fibre Channel adapter 255 to Ethernet devices such as enhanced Ethernet adapter 215 requires Fibre Channel to Ethernet data packet translation. In the particular example of FIG. 2, FCoE bridge 230 acts as the translation mechanism for the transfer of data between Fibre Channel protocol and Ethernet protocol network data structures. FCoE bridge 230 provides translation from Fibre Channel to Ethernet protocols in one direction. FCoE bridge 230 also provides translation in the opposite direction, namely from Ethernet to Fibre Channel protocols.

In another embodiment of network system 200 with FCoE capability, the destination MAC_Address of the network data packet is the FCoE bridge 230 itself. In this special case, network system with FCoE capability 200 does not require a translation of MAC_Address to N_Port_ID.

Figure 3:
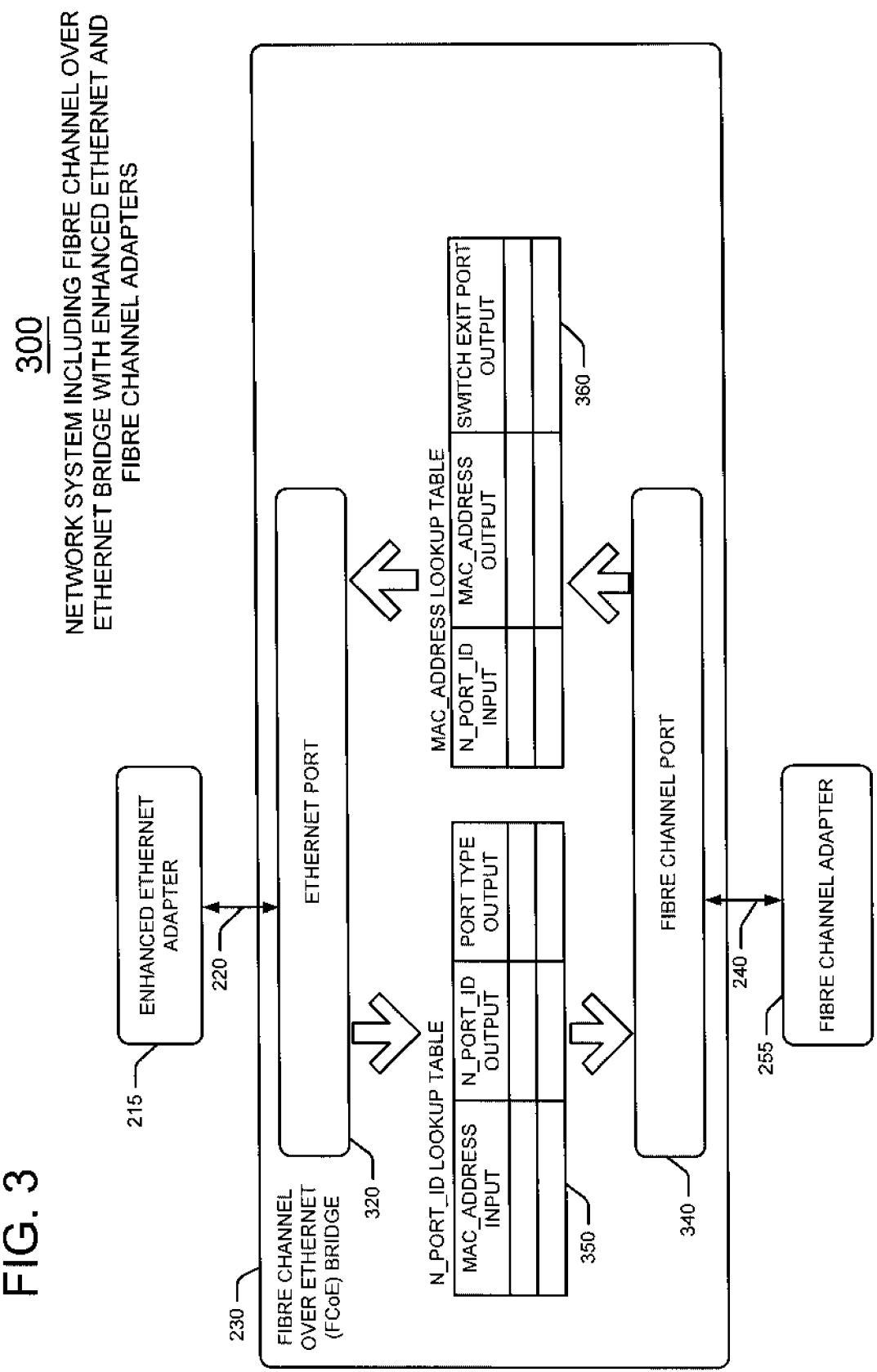
FIG. 3 is a block diagram with more detail of a Fibre Channel over Ethernet bridge with multiple adapters.

FIG. 3 shows a detailed example of a network system 300 including Fibre Channel over Ethernet bridge 230 with an enhanced Ethernet adapter 215 and a Fibre Channel adapter 255 that employs the disclosed "Fibre Channel over Ethernet" (FCoE) methodology and apparatus. Network system 300 of FIG. 3 employs several elements in common with network system 200 of FIG. 2. Like numerals indicate like elements when comparing network system 300 with network system 200. While not specifically shown in FIG. 3, enhanced Ethernet adapter 215 may exist in a server IHS such as server IHS 210 or other IHS. Likewise, Fibre channel adapter 255 may exist in a client IHS 250 or other IHS. In that case, server IHS 210 (not shown in FIG. 3, but shown in FIG. 2) generates a MAC_Address for association with each Fibre Channel port ID during data communication in the network system. The Fibre Channel port ID (N_Port_ID) serves the same purpose for Fibre Channel devices as the MAC address serves for Ethernet devices. The association between the MAC_Address and each Fibre Channel port ID is done before any transfer of data packets occurs. While more complex embodiments are possible, in the example of FIG. 3 the Ethernet fabric 220 and Fibre Channel fabric 240 exhibit a configuration wherein only Ethernet wiring or cable interconnects are shown. While network system 300 of FIG. 3 shows Enhanced Ethernet adapter 215 and Fibre Channel adapter 255 as standalone adapters, in actual practice these adapters may reside in respective client IHSs, server IHSs or other network devices.

Network system 300 includes Fibre Channel over Ethernet (FCoE) bridge 230. FCoE bridge 230 includes an Ethernet port 320 that provides a hardware portal or communication port for other Ethernet devices of network system 300. Ethernet port 320 couples to enhanced Ethernet Adapter 215. Enhanced Ethernet adapter 215 may be any Ethernet adapter that provides a communications interface to other network devices of network system 300 (not shown) and that supports Fibre Channel over Ethernet. On the other side of FCoE bridge 230, a Fibre Channel port 340 provides a hardware communications portal to Fibre Channel devices. Fibre Channel port 340 couples to Fibre Channel adapter 255. Fibre Channel adapter 255 acts as a communications interface into a Fibre Channel device such as a client IHS, server IHS, or other network device.

FCoE bridge 230 is a network data packet converter, translator, gateway or other apparatus with the ability to translate, convert, or otherwise modify network data packets in real time and to route such modified data packets to the proper network device via the proper network protocol. FCoE bridge 230 provides the bridge or translation of Ethernet and Fibre Channel packets in both directions, namely from Fibre Channel adapter 255 to enhanced Ethernet adapter 215 and from enhanced Ethernet adapter 215 to Fibre adapter 255. For example, as shown by the down arrow below Ethernet port 320, a network data packet from enhanced Ethernet adapter 215 enters Ethernet port 320 and thus FCoE bridge 230. FCoE bridge 230 uses an N_Port_ID lookup table 350 to provide a translation from the MAC_Address of the Ethernet data packet to the N_Port_ID of the corresponding Fibre Channel port. FCoE bridge 230 does not require sequential network system 300 clock time, but rather translates via lookup tables in real time or "on the fly". The translation mechanism of FCoE bridge 230 looks up the network data packet "MAC_Address" input value in N_Port_ID lookup table 350. N_Port_ID lookup table 350 operates on this input value to translate this input value to corresponding "N_Port_ID" and "Port Type" output values in real time network system 300 operation. The input to the lookup process is the "MAC_Address" value, whereas the outputs of the lookup process are the "N_Port_ID" and the "Port Type" values. FCoE bridge 230 may perform a verification to make sure the field in the lookup table 350 that specifies the data packet type matches the payload type field in the incoming Ethernet data packet header. FCoE bridge 230 attaches the newly looked-up N_Port_ID lookup table 350 information to the already existing network data packet and sends the data to Fibre Channel port 340 as shown by the down arrow thereon. The data packet is then sent to the appropriate Fibre Channel adapter 255. The lookup table 350 may be a hash table and hashing algorithms may be employed to improve performance.

In the opposite direction, namely from Fibre Channel adapter 255 to enhanced Ethernet adapter 215, FCoE bridge 230 uses a similar mechanism. A Fibre Channel device initiates a network data communication by sending a data packet from Fibre Channel adapter 255 to Fibre Channel port 340 of FCoE bridge 230. When Fibre Channel port 340 receives the data packet, as shown by the up arrow above Fibre Channel port 340, the data packet enters a MAC_Address lookup table 360 for translation. The translation mechanism of FCoE bridge 230 looks up the network data packet "N_Port_ID" input value in MAC_Address lookup table 360. MAC_Address lookup table 360 operates on this input value to translate this input value to corresponding "MAC_Address" and "switch exit port" output values. The input to the lookup process is the "N_Port_ID" value whereas the outputs of the lookup process are the "MAC_Address" and the "switch exit port" values. Switch exit port data represents the physical exit port, or in this example Ethernet port 320, at which the data packet will exit FCoE bridge 230. FCoE bridge 230 combines the MAC_Address and switch exit port data with the existing data packet and routes the new data packet to Ethernet port 320 as shown by the direction arrow above MAC_Address lookup table 360. The data packet moves from Ethernet port 320 to a representative enhanced Ethernet adapter 215 for communication to an Ethernet device such as a server IHS. The lookup table 360 may be a hash table and hashing algorithms may be employed to improve performance.

Figure 4:
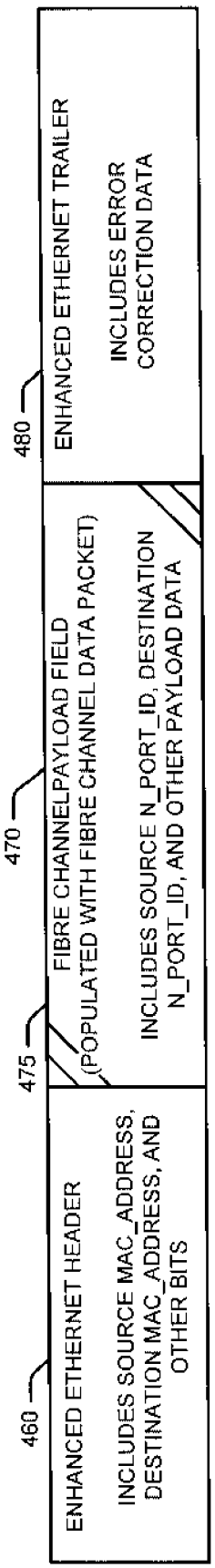
FIG. 4 is a representation of an enhanced Ethernet data packet employing the disclosed Fibre Channel over Ethernet capability and methodology.

FIG. 4 shows the data structure of an enhanced Ethernet data packet 400 for use by the disclosed network systems 200 and 300 in the transfer or communication of network data from network device to network device. A network device, such as server IHS 210 of a network system 200 with Fibre Channel over Ethernet FCoE capability, generates the enhanced Ethernet data packet 400. More specifically, enhanced Ethernet adapter 215 of server IHS 210 generates the enhanced Ethernet data packet 400. Server IHS 210 of network system 200 with FCoE capability generates and includes both the source MAC_Address and destination MAC_Address in an enhanced Ethernet header 460 data field of an enhanced Ethernet data packet 400. The source MAC_Address represents the MAC_Address of Enhanced Ethernet adapter 215 of server IHS 210. The destination MAC_Address represents the network device destination address to which server IHS 210 wants to send the packet. The enhanced Ethernet header 460 may also contain other bits for network data packet communication support such as, header length, type, fragment flags, header checksum, and other support data packet bits.

The enhanced Ethernet data packet 400 is also useful for communication from Fibre Channel adapter 255 to enhanced Ethernet adapter 215. Enhanced Ethernet data packet 400 includes a Fibre Channel payload field 470. Fibre Channel adapter 255 generates a Fibre Channel data packet 475 and populates Fibre Channel payload field 470 with Fibre Channel data packet 475. In more detail, FCoE bridge 230 takes Fibre Channel data packet 475 and encapsulates Fibre Channel data packet 475 in an Ethernet data packet to generate the enhanced Ethernet data packet 400 shown in FIG. 4. Fibre Channel data packet 475 includes the source and destination N_Port_ID corresponding to the source and destination port ID's of the Fibre Channel data packet. Fibre Channel data packet 475 also includes any payload data transmitting with the data packet. The Fibre Channel adapter 255 also generates the error correction data that FCoE bridge 230 includes as an enhanced Ethernet trailer 480 in enhanced Ethernet data packet 400.

Figure 5:
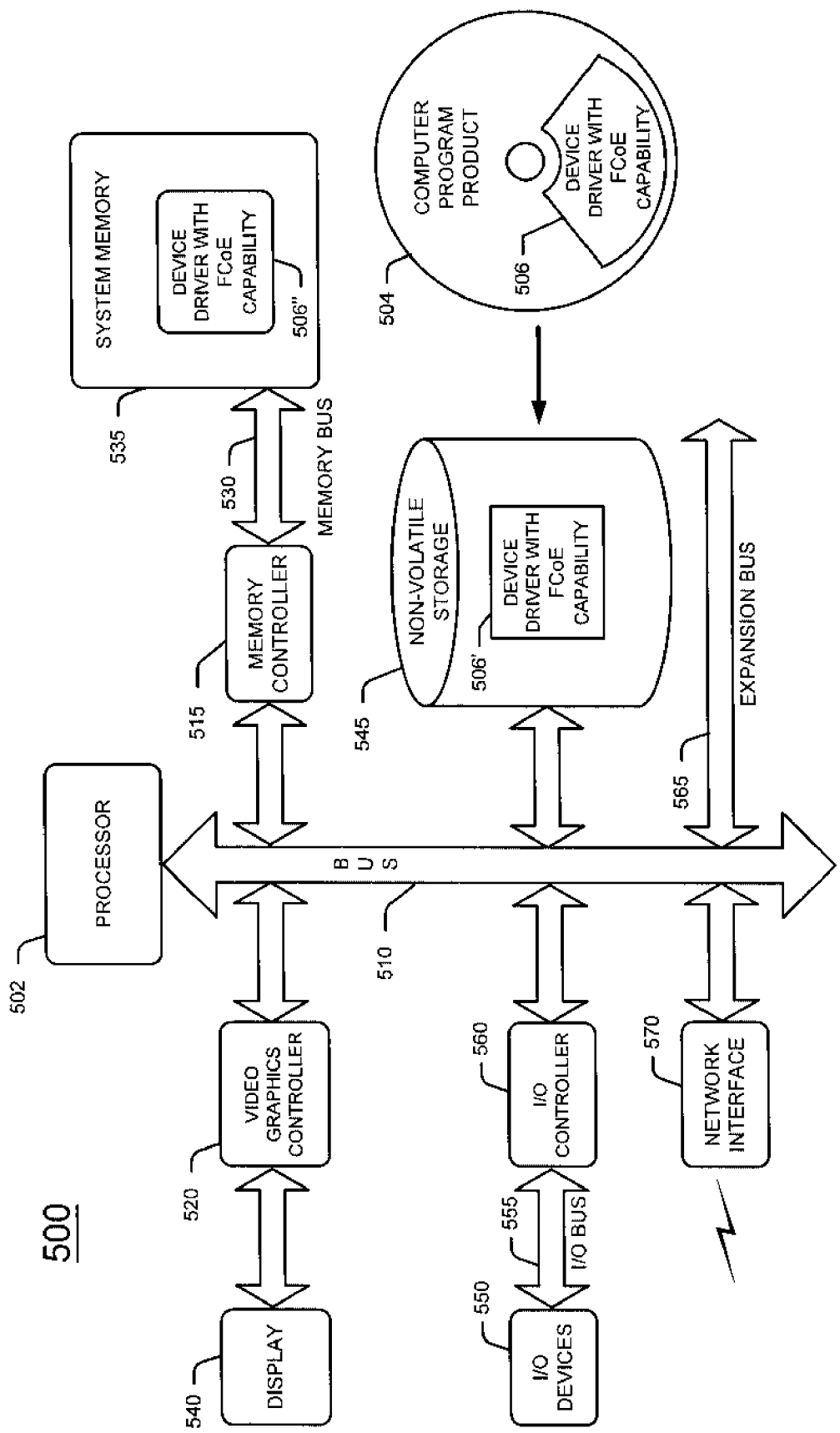
FIG. 5 is a block diagram of a network information handling system employing the disclosed Fibre Channel over Ethernet capability and methodology.

FIG. 5 is a simplified block diagram of a representative information handling system (IHS) 500 that the disclosed network system 200 may employ as a network server IHS 210, client HIS 250, or other network device IHS to achieve Fibre Channel over Ethernet (FCoE) capability. IHS 500 includes a processor 502 such as a microprocessor for performing processing operations. In one embodiment, information handling system (IHS) 500 includes a computer program product 504 that includes device driver software 506 with the FCoE capability as described herein. Computer program product 504 may be in the form of a disk, cartridge or other movable storage media.

IHS 500 further includes a bus 510 that couples processor 502 to memory controller 515 and video graphics controller 520. System memory bus 530 couples memory controller 515 to system memory 535 as shown. In some applications, processor 502 may include an integrated memory controller 515. In actual practice, bus 510 may include multiple buses, for example a memory bus and an I/O bus. A display 540 couples to video graphics controller 520. Non-volatile storage 545, such as a hard disk drive, compact disk CD drive, DVD drive, or other non-volatile storage, couples to bus 510 to provide IHS 500 with permanent storage of information. I/O devices 550, such as a keyboard and a mouse pointing device, couple via I/O bus 555 and I/O controller 560 to bus 510. One or more expansion busses 565, such as USB, IEEE 1394 bus, ATA, SATA, PCI, PCIE and other busses, couple to bus 510 to facilitate the connection of peripherals and devices to IHS 500. A network interface adapter 570, couples to bus 510 to enable IHS 500 to connect by wire or wirelessly to a network and other information handling systems.

In one embodiment, computer program product 504 is a disk or other storage medium that includes a device driver 506 with the disclosed FCoE capability software functionality.

IHS 500 may include a high level operating system (OS) or other software that manages the processor functional units therein. Device driver software typically contains a series of software instructions that run under the operating system software in IHS 500. Computer program product 504 is a CD, DVD, other media disk, media drive, cartridge or other storage medium. A user or other entity supplies computer program product 504 to non-volatile storage 545 for storage therein. In this manner, non-volatile storage 545 stores the device driver software with FCoE capability as device driver 506'. When IHS 500 initializes or boots up, an operating system (OS not shown) containing the FCoE capability software, namely device driver 506' loads into system memory 535 as device driver 506" for use by IHS 500. In this manner, the device driver with FCoE capability software is available for use by system users, programmers and other entities that employ IHS 500.

While FIG. 5 shows one IHS that employs the FCoE capability methodology as IHS 500, IHS 500 may take many forms. For example, IHS 500 may take the form of a desktop, server, gateway, portable, laptop, notebook, or other form factor computer or data processing system. IHS 500 may also take other form factors such as a gaming device, a personal digital assistant (PDA), a portable telephone device, a communication device or other devices that include processor and memory.

Device driver with FCoE capability 506", such as in server IHS 210, forms enhanced Ethernet data packet 400. Device driver with FCoE capability 506" in server IHS 210 initiates a transfer of enhanced Ethernet data packet 400 from IHS 210 enhanced Ethernet adapter 215 to FCoE bridge 230. FCoE bridge 230 employs the lookup table methodology described above and below to translate an incoming enhanced Ethernet data packet, thus populating the outgoing Fibre Channel data packet. Ultimately FCoE bridge 230 sends the Fibre Channel data packet to Fibre Channel adapter 255. In the opposite direction, a device driver with Fibre Channel capability such as in client IHS 250 forms Fibre Channel data packet and sends that Fibre Channel data packet to FCoE bridge 230. FCoE bridge 230 employs the lookup table methodology described above and below to translate an incoming Fibre Channel data packet to an enhanced Ethernet data packet. FCoE bridge 230 sends the outgoing enhanced Ethernet data packet to enhanced Ethernet adapter 215.

Figure 6:
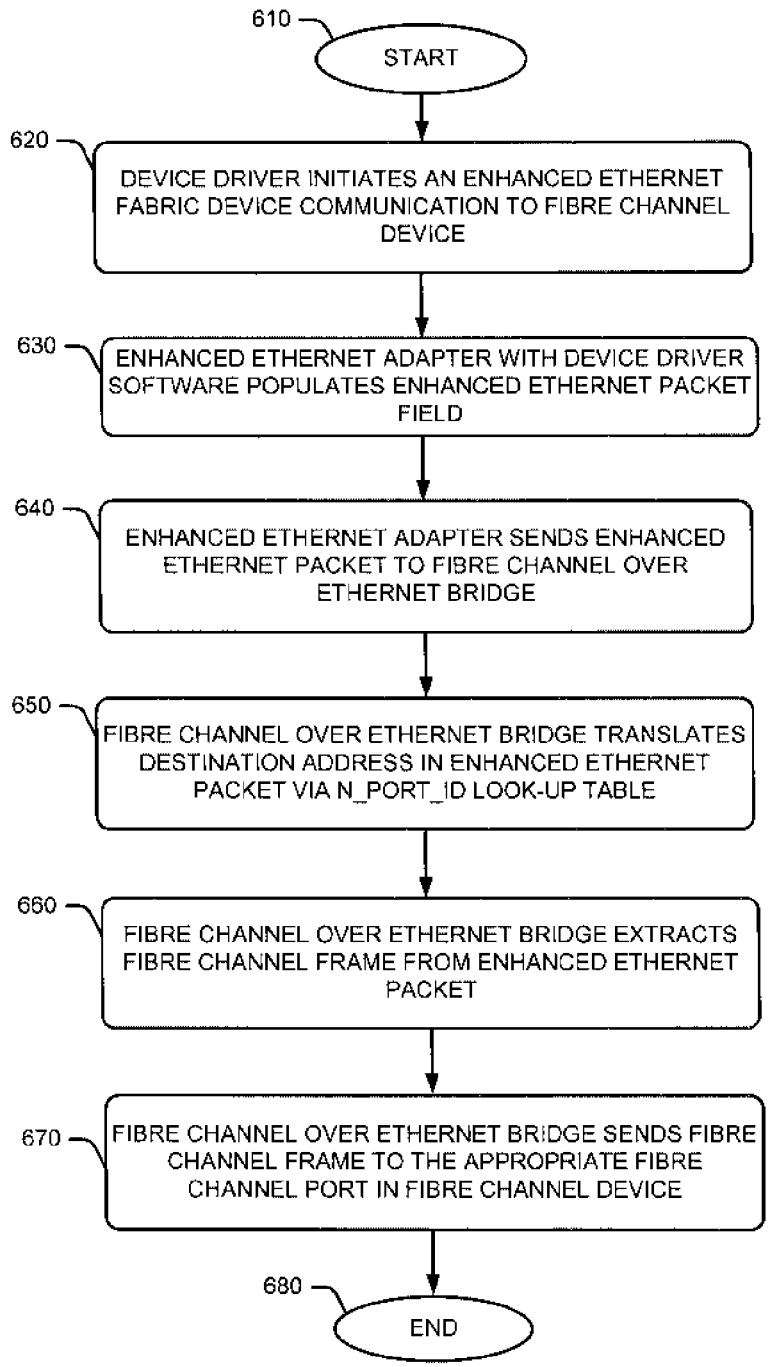
FIG. 6 is a flow chart that depicts an enhanced Ethernet to Fibre Channel translation methodology of FIG. 2.

FIG. 6 is a flowchart that depicts process flow in network system 200 or 300 that employs the disclosed "Fibre Channel over Ethernet" FCoE methodology. In more detail, FIG. 6 shows the transfer of network data from an enhanced Ethernet network device or IHS to a Fibre Channel network device or IHS using the disclosed FCoE methodology. The device driver with FCoE capability software 506" shown in FIG. 5 above is one of multiple software applications available to devices in a network system 200 with FCoE capability. Process flow begins at start block 610. Device driver with FCoE capability software 506" initiates an enhanced Ethernet data packet communication, such as from server IHS 210 to a Fibre Channel device such as client IHS 250 of FIG. 2, as per block 620. Client IHS 250 may be a Fibre Channel network storage device, or other Fibre Channel network device.

Enhanced Ethernet adapter 215 with device driver with FCoE capability software 506" populates enhanced Ethernet data packet 400, as per block 630. Device driver with FCoE capability 506" populates the Fibre Channel data packet payload field 470, and the enhanced Ethernet adapter 215 populates the enhanced Ethernet header 460 of enhanced Ethernet data packet 400. The enhanced Ethernet adapter 215 sends enhanced Ethernet data packet 400 to FCoE bridge 230, as per block 640. Using the N_Port_ID lookup table 350, FCoE bridge 230 translates enhanced Ethernet data packet 400 MAC_Address data into the destination N_Port_ID data that includes an "FC" port type, as per block 650. Since the destination is a Fibre Channel device, in this embodiment network client IHS 250 with Fibre Channel adapter 255 receives data from the enhanced Ethernet data packet. Only Fibre Channel data packet 470 from the original enhanced Ethernet data packet 400 needs to be sent to the Fibre Channel device. FCoE bridge 230 extracts the Fibre Channel data packet from enhanced Ethernet data packet 400, as per block 660. FCoE bridge 230 sends the Fibre Channel data packet 475 from Ethernet data packet 400 to the appropriate Fibre Channel port, in Fibre Channel adapter 255, as per block 670. Operational flow ends, as per end block 680.

Figure 7:
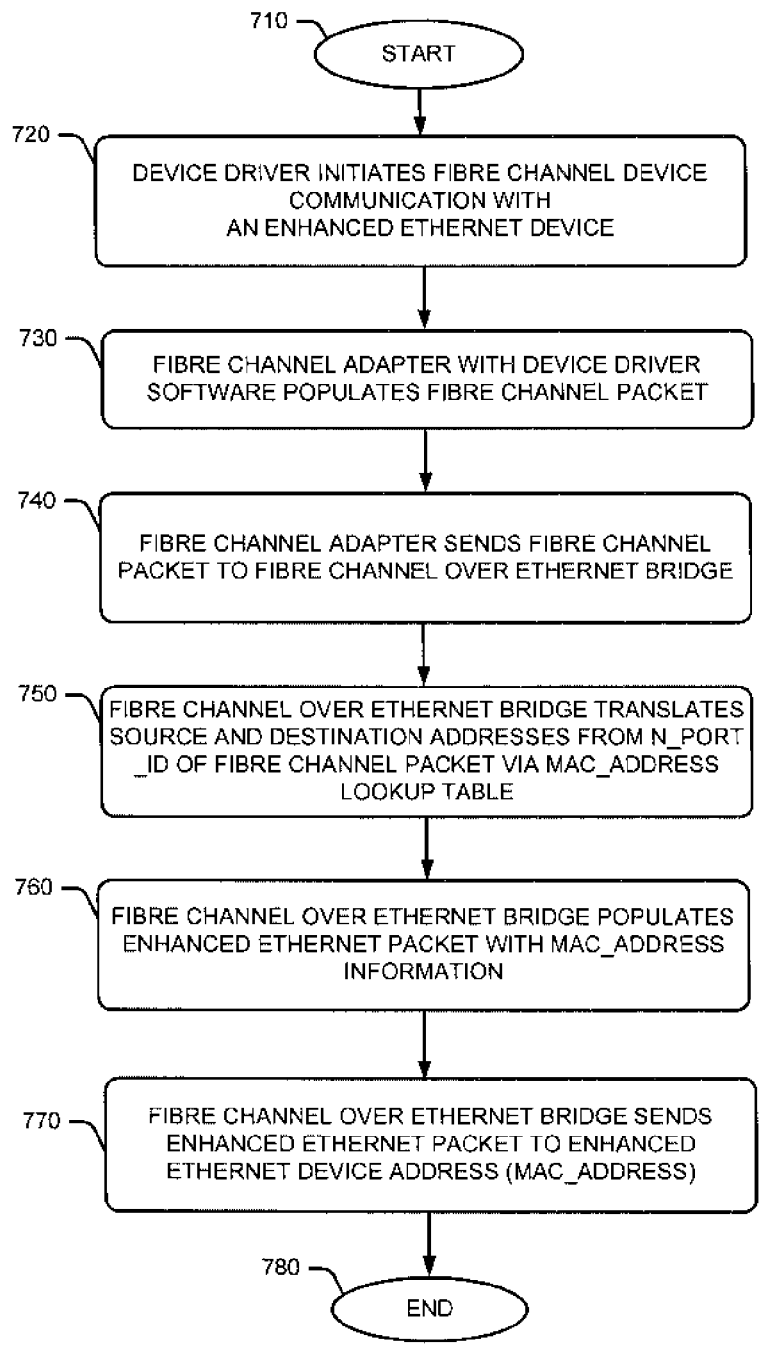
FIG. 7 is a flow chart that depicts a Fibre Channel to enhanced Ethernet translation methodology of FIG. 2.

FIG. 7 is a flowchart that depicts process flow in network system 200 or 300 that employs the disclosed "Fibre Channel over Ethernet" FCoE methodology. In more detail, FIG. 7 shows the transfer of network data from a Fibre Channel network device or IHS to an enhanced Ethernet or IHS network device using the disclosed FCoE methodology. The device driver with FCoE capability software 506" shown in FIG. 5 above is one of multiple software applications available to devices in network system with FCoE capability 200. Process flow begins at start block 710. Device driver with FCoE capability software 506" in network client IHS 250 initiates a Fibre Channel device communication to transfer a Fibre Channel data packet to an enhanced Ethernet device such as server IHS 210, as per block 720. Fibre Channel adapter 255 uses its device driver to populate the Fibre Channel data packet 470 to form the enhanced Ethernet data packet 400, as per block 730. Fibre Channel adapter 255 sends Fibre Channel data packet 470 to FCoE bridge 230, as per block 740. Using the MAC_Address lookup table 360, FCoE bridge 230 translates Fibre Channel packet 470 N_Port_ID data into the destination MAC_Address data that includes a switch exit port or Ethernet port 320, as per block 750. In this embodiment, the destination is an enhanced Ethernet network device or more specifically server IHS 210 with enhanced Ethernet adapter 215. FCoE bridge 230 populates enhanced Ethernet data packet 400 with MAC_Address information, as per block 760. FCoE bridge 230 sends enhanced Ethernet packet 400 to Ethernet device or server IHS 210 with enhanced Ethernet adapter 215 as a MAC_Address destination, as per block 770. Operational flow ends, as per end block 780.

Figure 8:
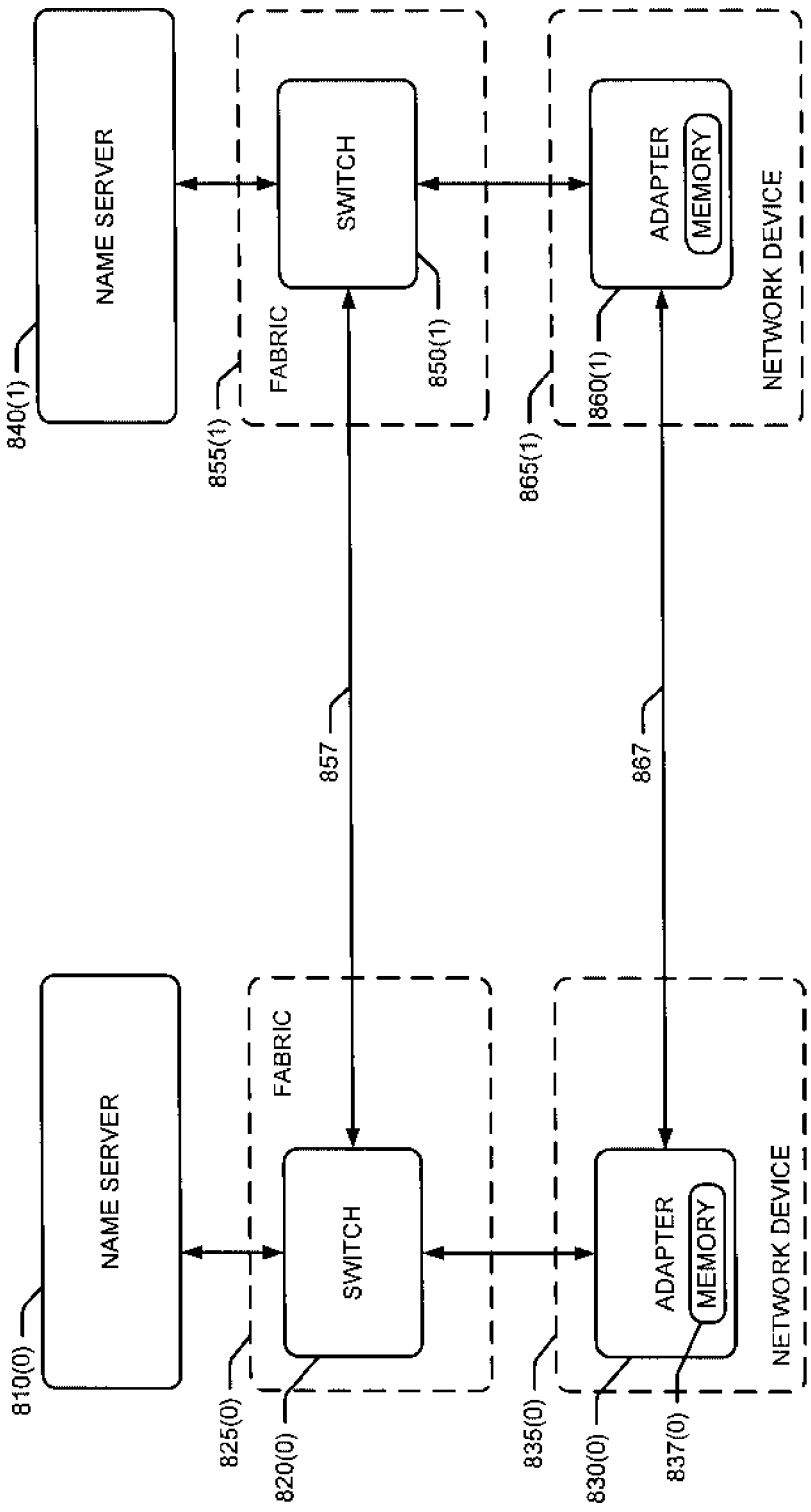
FIG. 8 is a block diagram of a network system with adapters, switches, and name servers employing the disclosed Fibre Channel over Ethernet capability and methodology.

FIG. 8 shows a simplified block diagram of a network system 800 with adapters, switches, and name servers that employs the disclosed "Fibre Channel over Ethernet" (FCoE) methodology and apparatus. In one embodiment, network system 800 includes a name server 810(0). Name servers are capable of requesting network device names, network addresses and storing these names and addresses for future communication in a network system. Name server 810(0) couples to a switch 820(0) of a fabric 825(0). In this embodiment, fabric 825(0) represents a network fabric including a single network switch 820(0). However, in another embodiment fabric 825(0) may provide network connectivity through any number of switches, routers, hubs, etc. Switch 820(0) couples to an adapter 830(0) of a network device 835(0). Network devices may include network servers, network clients, network gateways, network data storage devices, or other network devices with network adapter interfaces.

A name server 840(1) couples to a switch 850(1) of a fabric 855(1). Fabric 855(1) represents a network fabric that includes a single switch 855(1) for simplicity. However, in actual practice fabric 855(1) may provide network connectivity and include any number of switches, routers, hubs, etc. Switch 850(1) couples to switch 820(1) by any network connection mechanism such as twisted pair wiring, fibre optic cable, or other connective apparatus 857. Switch 850(1) couples to an adapter 860(1) of a network device 865(1). Network device 865(1) may be a network server, network client, network gateway, network data storage device, or other network device with a network adapter interface. Adapter 860(1) couples to adapter 830(0), thus providing a data communication pathway 867 between network device 835(0) and network device 865(1). One embodiment of the disclosed methodology relates to communication between adapters such as 830(0) and 860(1) such as the case wherein adapter 830(0) is within a client IHS/network device and adapter 860(1) is within a server IHS/network device, or vice versa.

As described above with respect to FIG. 4, data packets that transfer from network device to network device in a network system must contain a source and destination address in one embodiment. It is a function of device driver software 560 and name servers such as 810(0), 840(1) to assign each network adapter device a name or port ID before any network data packet transmission occurs. With the complexity of a network containing both Ethernet and Fibre Channel protocols for network device naming, network systems require more elaborate methodologies to establish an efficient and non-overlapping addressing scheme for these network system protocols.

Figure 9:
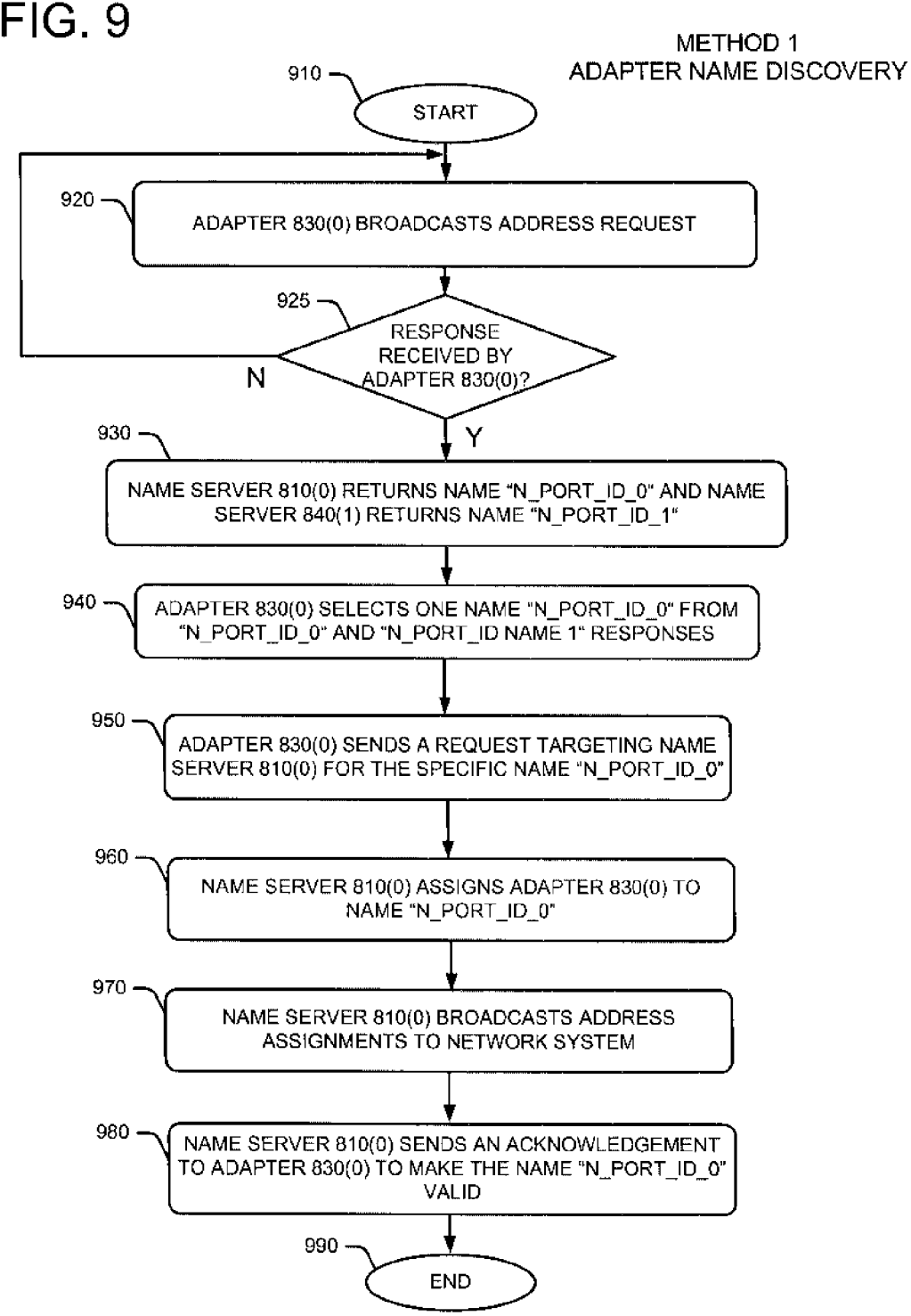
FIG. 9 is a flow chart that depicts an adapter name discovery method 1 of the network system of FIG. 8.

FIG. 9 is a flowchart that depicts one embodiment of an adapter name discovery methodology for network system 800 of FIG. 8. As stated above, network system 800 is a network system with adapters, switches, and name servers. Adapter name discovery method 1 operation begins at start block 910. For purposes of this example, network system 800 does not have an N_Port_ID assignment for adapter 830(0) upon initiation of the methodology of FIG. 9. If adapter 830(0) desires to communicate with other devices of network system 800 servers, it must first obtain a minimum of one unique N_Port_ID from a name server such as name server 810(0). When adapter 830(0) does obtain an N_Port_ID, from that point forward all other network devices of network system 800, such as adapters, switches, and name servers, use the same adapter 830(0) N_Port_ID as a communication address within network data packets such as those of enhanced Ethernet data packet 400.

Adapter 830(0) broadcasts an address request, as per block 920. This address request is effectively a request to obtain a name, or N_Port_ID assignment, for itself. An address request is a special communication to all network devices of network system 800, i.e. to its adapters, switches and name servers, that effectively seeks to find any name servers. Adapter 830(0) waits for a response from a name server. Adapter 830(0) continues broadcasting an address request, as per block 920. Adapter 830(0) conducts a test at decision block 925 to determine if adapter 830(0) received a response to the address request. If adapter 830(0) does not receive a response to the address request, then process flow continues back to block 920 and adapter 830(0) continues to broadcast the address request. However, when adapter 830(0) does receive a response to the address request from one or more name servers, then a proposed N_Port_ID is contained within that response. For example, in FIG. 8 name server 810(0) returns a name of "N_Port_ID_0" and name server 840(1) returns a name of "N_Port_ID_1", as per block 930. The names that name server 810(0) and name server 840(1) return are potential source addresses for use by adapter 830(0) for use in future communications in network system 800 among its adapters, switches, and name servers.

Adapter 830(0) selects one of name server 810(0) and name server 840(1) responses. For this example, adapter 830(0) selects the name "N_Port_ID_0" from the name server 810(0) response, as per block 940. At this point in time, the name servers have sent name responses; however network system 800 does not yet recognize any name assignments to adapter 830(0). Adapter 830(0) sends a request targeting name server 810(0) for the specific name "N_Port_ID_0", as per block 950. Adapter 830(0) is now requesting the assignment of that name per previous response by name server 810(0), and not the name per previous response by name server 840(1). In response to the adapter 830(0) request, name server 810(0) assigns adapter 830(0) to name "N_Port_ID_0", as per block 960. Adapter 830(0) and name server 810(0) are now aware of the unique N_Port_ID available for 810(0). However, other network devices and specifically network adapters of network system 800 are not yet specifically aware of the adapter 830(0) N_Port_ID. To communicate from the N_Port_ID of adapter 830(0) to another network device, name server 810(0) broadcasts address assignments (including adapter 830(0) to the network devices of network system 800), as per block 970. To complete the naming process, name server 810(0) then sends an acknowledgment to adapter 830(0) to make the name "N_Port_ID_0" valid, as per block 980. Any future communications to or from adapter 830(0) will now contain the proper N_Port_ID that name server 810(0) assigns. Operational flow ends, as per end block 990.

Figure 10:
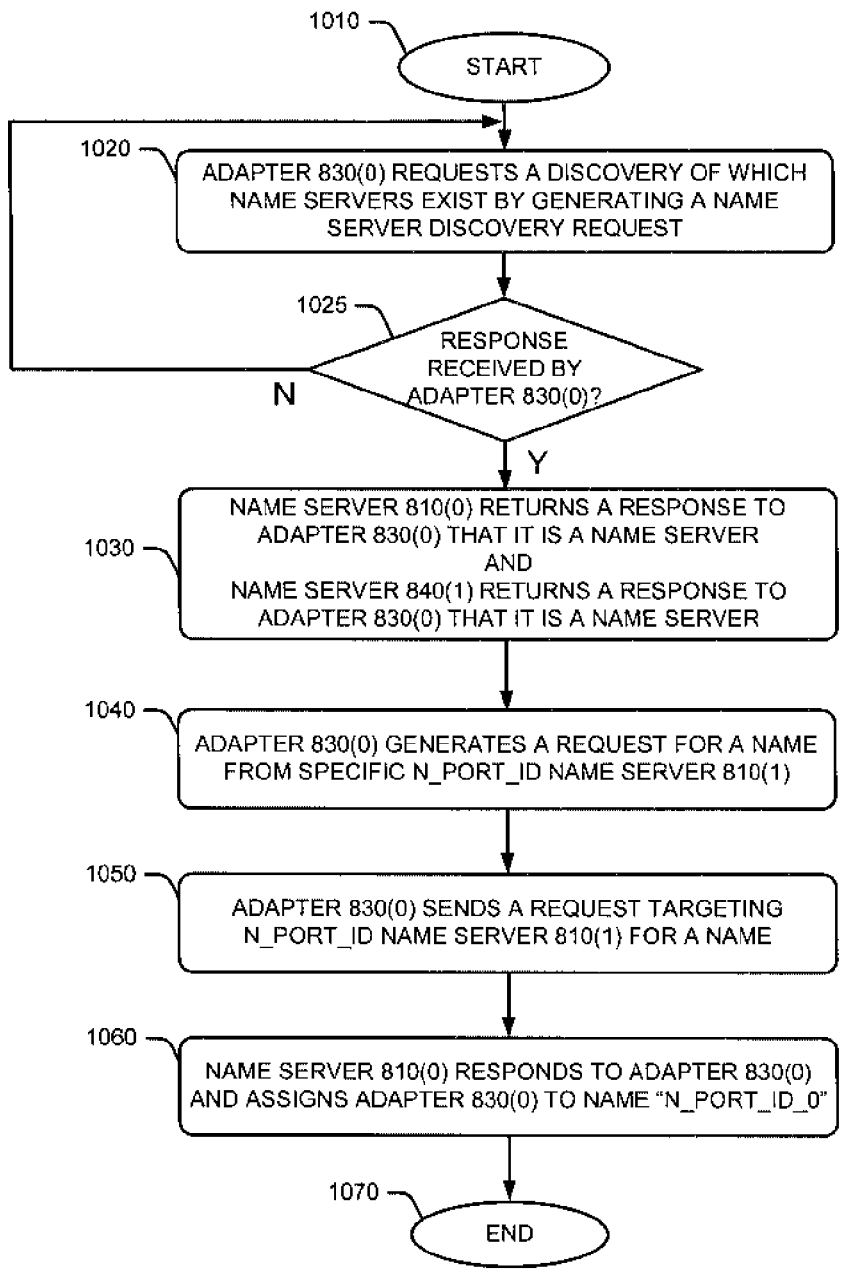
FIG. 10 is a flow chart that depicts an adapter name discovery method 2 of the network system of FIG. 8.

FIG. 10 is a flowchart that depicts another adapter name discovery method 2 for the network system 800 of FIG. 8. Adapter name discovery method 2 operation begins at start block 1010. In this example, adapter 830(0) must obtain an N_Port_ID prior to communication with other network devices such as the other adapters, switches, and name servers of network system 800. Adapter 830(0) requests a discovery of the name servers that exist within system 800 with a name server discovery request, as per block 1020. Adapter 830(0) conducts a test at decision block 1025 to determine if adapter 830(0) receives a response from any name server. If the test of block 1025 determines adapter 830(0) receives no responses from any name servers, then adapter 830(0) continues generating and transmitting name server discovery requests, as per block 1020. However, if the test of block 1025 determines adapter 830(0) does receive a response to the discover name server request from a name server, process flow continues from decision block 1025 to name server response block 1030. More particularly, in this example, name server 810(0) returns a response to adapter 830(0) that it is a name server. Also, name server 840(1) returns a response to adapter 830(0) that it is also a name server, as per block 1030.

Adapter 830(0) generates a request for an N_Port_ID name assignment from a specific name server, such as name server 810(0), as per block 1040. More specifically, adapter 830(0) generates a network data packet for requesting a unique name assignment from name server 810(0). Adapter 830(0) sends a request, namely the network data packet per block 1040, targeting N_Port_ID name server 810(1), as per block 1050. Name server 810(0) responds to adapter 830(0) and assigns adapter 830(0) to name "N_Port_ID_0", as per block 1060. Operational flow ends, as per end block 1070.

In another embodiment of the naming methodology that applies to network system 800 of FIG. 8, some adapter 830(0) functions shown in the FIG. 10 flowchart are not always necessary. Referring again to FIG. 10, name server 810(0) may respond immediately after name servers return a response indicating that they are name servers to adapter 830(0), per block 1030. In other words, this embodiment removes blocks 1040 and 1050 from the flowchart of FIG. 10.

Name server 810(0) still responds to adapter 830(0) and assigns adapter 830) to name "N_Port_ID_0)", as again per block 1060. In this embodiment the name servers decide which particular name server will service the request from adapter 830(0), rather than the adapter 830(0) deciding which name server will service the request from adapter 830(0). Operational flow ends for this embodiment, as per end block 1070.

Figure 11:
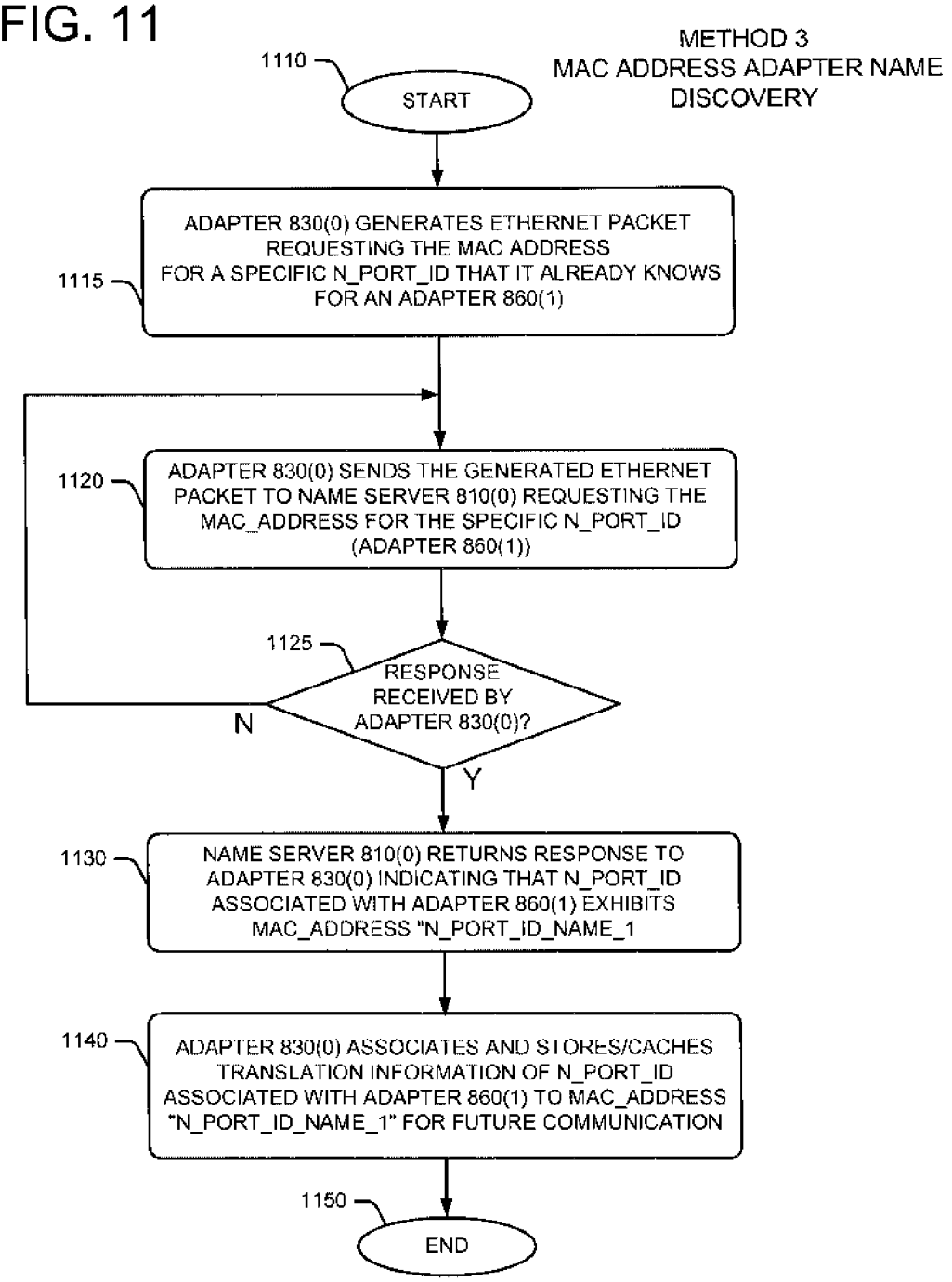
FIG. 11 is a flow chart that depicts an adapter N_Port_ID names discovery method 1 of the network system of FIG. 8.

FIG. 11 is a flowchart that depicts an example of an MAC address name discovery method 3 for the network system 800 of FIG. 8. In this example, adapter 830(0), namely an Ethernet adapter, desires to communicate with another adapter 860(1). However, although adapter 830(0) knows the N_Port_ID of adapter 860(1), adapter 830(0) does not know the MAC_Address of adapter 860(1). The adapter name discovery method 3 begins at start block 1110. In this example, adapter 830(0) generates an Ethernet data packet requesting the MAC address for a specific N_Port_ID adapter 860(1), as per block 1115. Adapter 830(0) desires to find the MAC address of adapter 860(1) so that it can send Ethernet packets to that MAC address. Adapter 830(1) then sends the generated Ethernet data packet to name server 810(0) requesting the MAC_Address for the specific N_Port_ID adapter 860(1), as per block 1120.

Adapter 830(0) conducts a test at decision block 1125 to determine if adapter 830(0) receives a response from name server 810(0). If the test of block 1125 determines that adapter 830(0) receives no response from name server 810(0), then adapter 830(0) continues sending Ethernet data packets to name server 810(0), as per block 1120. However, if the test per block 1125 determines that adapter 830(0) receives a response, then this indicates that name server 810(0) responded. More specifically, as per block 1130, name server 810(0) returns a response to adapter 830(0) indicating that N_Port_ID adapter 860(1) exhibits Ethernet MAC_Address "N_Port_ID_Name_1". Adapter 830(0) associates and stores/caches translation information "N_Port_ID_Name_1" as the MAC_Address for adapter 860(1), as per block 1140. Adapter 830(0) stores this translation information in memory 837(0) in adapter 830(0). This enables future communications with the adapters, switches, and name servers of network system 800. Process flow ends at end block 1150. The implementation of the methodology of FIG. 11 can be an extension of a suitable protocol such as ARP (address resolution protocol), DHCP (dynamic host configuration protocol), or other addressing protocol. In one embodiment, adapter 830(0) stores the MAC address of adapter 860(1) in memory 837(0) once adapter 830(0) obtains this translation information from name server 810(0).

FIG. 12 is a flowchart that depicts another example of an N_Port_ID adapter name discovery method 4 for the network system of FIG. 8. In this example, Ethernet adapter 830(0) desires to communicate with other adapters of network system 800. However, the other adapter names are not currently available to adapter 830(0). The N_Port_ID adapter name discovery method 4 operations begin at start block 1210. Adapter 830(0) generates an Ethernet data packet for an N_Port_ID multiple name request, as per block 1215. In one embodiment, adapter 830(0) may request a list of all adapters in network system 800 within a specified device class, such as a SCSI device class, a Firewire device class, or other adapter device class. Adapter 830(0) then sends the Ethernet data packet to name server 810(0) and requests the N_Port_ID of one or more valid Ethernet devices with which adapter 830(0) may communicate or with the specified device class, as per block 1220.

Name server 810(0) may make a determination from the Ethernet data packet from adapter 830(0) to send only one valid N_Port_ID to adapter 830(0). Name server 810(0) may also make a determination from the Ethernet data packet from adapter 830(0) to send a group of valid N_Port_ID data, namely one valid N_Port_ID at a time, to adapter 830(0). Name server 810(0) may also make a determination from the Ethernet data packet from adapter 830(0) to send all valid N_Port_ID data together as a group of valid N_Port_ID data to adapter 830(0). Name server 810(0) interprets the request from adapter 830(0) and determines if name server 810(0) decides to send all valid N_Port_ID's, as per decision block 1230. If the test per block 1230 determines that adapter 830(0) requests to send all valid N_Port_ID's, name server 810(0) sends adapter 830(0) all N_Port_ID and MAC_Address data for all valid Ethernet devices with which adapter 830(0) may communicate or with the specified device class, as per block 1240. If the test per block 1230 determines that adapter 830(0) requests not to send all valid N_Port_ID's, name server 810(0) sends adapter 830(0) the first or next in a sequential list of all N_Port_ID and MAC_Address data for all valid Ethernet devices with which adapter 830(0) may communicate, as per block 1250. Name server 810(0) performs a test to determine if it will send the next data regarding valid Ethernet devices, per decision block 1260. If the test per block 1260 determines that name server 810(0) desires to send the next valid Ethernet device address, then name server 810(0) sends adapter 830(0) the next in a sequential list of all address data for valid Ethernet devices, as per block 1250 and flow continues. However, if the test per block 1260 determines that name server 810(0) does not desire to send the next valid Ethernet device address, then adapter 830(0) associates and caches N_Port_ID to MAC_Address translation information for future communication, as per block 1270. Name server 810(0) will stop sending valid Ethernet device addresses when it completes the total list it stores in name server 810(0) memory. Operational flow ends, as per end block 1280.

FIG. 13 is a flowchart that depicts an adapter attribute discovery method 5 for network system 800 of FIG. 8. In this example, adapter 830(0), such as a Fibre Channel adapter, desires to determine the network attributes of another specific adapter, such as adapter 860(1) of network system 800. Adapter attribute data includes adapter information such as disk drive type, tape drive type, special function support, device capacity, and other network adapter device attributes. A network adapter may contain one or multiple attributes corresponding to that particular adapter. The N_Port_ID adapter attribute discovery method 5 begins at start block 1310. Adapter 830(0) sends a data packet initiating a "FC_PLOGI" (Fibre Channel P Login) command to N_Port_ID device adapter 860(1), as per block 1320. N_Port_ID device adapter 860(1) returns a set of adapter 860(1) attributes to adapter 830(0), as per block 1330. Adapter 830(0) associates and caches representative N_Port_ID adapter 860(1) attribute information for future use, as per block 1340. Adapter 830(0) employs on board cache memory 837(0) for attribute information storage and other data storage. Process flow ends at end block 1350.

Those skilled in the art will appreciate that the various structures disclosed can be implemented in hardware or software. Moreover, the methodology represented by the blocks of the flowcharts of FIGS. 6, 7 and 9-13, may be embodied in a computer program product, such as a media disk, media drive or other media storage such as computer program product medium 504 of FIG. 5.

In one embodiment, the disclosed methodology is implemented as a client application, namely a set of instructions (program code) in a code module that may, for example, be resident in system memory 535 of IHS 500 of FIG. 5. Until required by IHS 500, the set of instructions may be stored in another memory, for example, non-volatile storage 545 such as a hard disk drive, or in a removable memory such as an optical disk or floppy disk, or downloaded via the Internet or other computer network. Thus, the disclosed methodology may be implemented in a computer program product for use in a computer such as IHS 500. It is noted that in such a software embodiment, code that carries out the functions depicted in the FIGS. 6, 7 and 9-13 flowcharts may be stored in system memory 535 while such code is being executed. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The foregoing discloses an information handling system that employs a device driver software methodology to enable Fibre Channel data packet transfers in a predominantly Ethernet protocol network system. In one embodiment, the disclosed method includes applying a data packet lookup address conversion in real time for address translation during the transmission of Fibre Channel over Ethernet network data. In one embodiment, the FCoE capability software provides a method and apparatus for network adapter name discovery in a network system. In another embodiment, FCoE capability software enables an adapter in one network system to discover the name and attributes of another adapter in another network system.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

We claim:

1. A method of adapter name discovery in a network system, comprising:

providing a first plurality of name server network devices that communicates with a second plurality of network devices via a network fabric;

requesting an adapter name, by a requester adapter in a network device in the second plurality of network devices, the requester adapter transmitting a discover name request to the first plurality of name server network devices;

transmitting, by each name server network device, a respective adapter name to the requester adapter;

receiving, by the requester adapter, a plurality of adapter names from the name server network devices;

selecting, by the requester adapter, any one of the plurality of adapter names transmitted by the name server network devices as the selected name for the requester adapter, the name server network device that transmitted the selected name being designated the particular name server network device;

transmitting, by the requester adapter, an assignment request for the selected name that targets the particular name server network device;

assigning, by the particular name server network device, the selected name to the requester adapter;

broadcasting, by the particular name server network device, the selected name for the requester adapter to other network devices to make the other network devices aware of the assignment of the selected name to the requester adapter; and transmitting, by the particular name server network device, an acknowledgement to the requester adapter to validate the selected name for the requester adapter.

2. The method of claim 1, wherein the requesting step includes transmitting, by the requester adapter, a discover name request to all of the name server network devices in the first plurality of network devices.

3. The method of claim 1, wherein one of the first plurality of name server network devices is a Fibre Channel network device and one of the second plurality of network devices is an Ethernet device.

4. The method of claim 1 wherein one of the first plurality of name server network devices is an Ethernet network device and one of the second plurality of network devices is a Fibre Channel device.

5. A network system, comprising:

a first plurality of name server network devices;

a second plurality of network devices;

a network fabric that couples the first and second pluralities of network devices together to enable communication therebetween;

wherein one of the second plurality of network devices includes a requester adapter that transmits a discover name request to the first plurality of name server network devices, such that in response the name server network devices transmit respective adapter names to the requester adapter, the requester adapter receiving a plurality of adapter names from the name server network devices, the requester adapter selecting any one of the plurality of names transmitted by the name server network devices as the selected name for the requester adapter, the name server network device that transmitted the selected name being designated the particular name server, the requester adapter transmitting an assignment request for the selected name that targets the particular name server network device; and wherein the particular name server network device assigns the selected name to the requester adapter, the particular name server network device broadcasting the selected name for the requester adapter to other network devices to make the other network devices aware of the assignment of the selected name to the requester adapter, the particular name server network device transmitting an acknowledgement to the requester adapter to validate the selected name for the requester adapter.

6. The network system of claim 5, wherein the requester adapter is configured to transmit a discover request to all of the name server network devices in the first plurality of network devices.

7. The network system of claim 5, wherein one of the first plurality of name server network devices is a Fibre Channel network device and one of the second plurality of network devices is an Ethernet device.

8. The network system of claim 5, wherein one of the first plurality of name server network devices is an Ethernet network device and one of the second plurality of network devices is a Fibre Channel device.

* * * * *